United States Patent
Czachor

(10) Patent No.: US 6,951,112 B2
(45) Date of Patent: Oct. 4, 2005

(54) METHODS AND APPARATUS FOR ASSEMBLING GAS TURBINE ENGINES

(75) Inventor: Robert P. Czachor, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 44 days.

(21) Appl. No.: 10/775,645

(22) Filed: Feb. 10, 2004

(65) Prior Publication Data

US 2005/0172641 A1 Aug. 11, 2005

(51) Int. Cl.⁷ ................................................ F02C 7/20

(52) U.S. Cl. ..................... 60/798; 29/889.22

(58) Field of Search ............... 60/796, 798; 29/890.01, 29/889.22

(56) References Cited

U.S. PATENT DOCUMENTS

| | | | |
|---|---|---|---|
| 4,614,082 A | * | 9/1986 | Sterman et al. ............... 60/796 |
| 5,211,541 A | | 5/1993 | Fledderjohn et al. |
| 5,483,792 A | | 1/1996 | Czachor et al. |
| 5,622,475 A | | 4/1997 | Hayner et al. |
| 2003/0185674 A1 | * | 10/2003 | Alford et al. ............ 415/173.1 |

* cited by examiner

Primary Examiner—Ehud Gartenberg
(74) Attorney, Agent, or Firm—Armstrong Teasdale LLP; William Scott Andes

(57) ABSTRACT

A method for assembling a gas turbine engine includes coupling an outer structure within the gas turbine engine, wherein the outer structure includes a socket extending from a radially inner surface of the outer structure, and coupling an inner structure to the outer structure by inserting a radial pin through the inner structure and into the socket such that the inner structure is aligned axially, circumferentially, and with respect to an engine centerline axis extending through the gas turbine engine.

17 Claims, 3 Drawing Sheets

US 6,951,112 B2

METHODS AND APPARATUS FOR ASSEMBLING GAS TURBINE ENGINES

STATEMENT REGARDING FEDERALLY SPONSORED RESEARCH OR DEVELOPMENT

The U.S. Government may have certain rights in this invention pursuant to contract number DAAE07-00-C-N086.

BACKGROUND OF THE INVENTION

This invention relates generally to gas turbine engines, and more particularly to methods and apparatus for assembling gas turbine engines.

In at least some known gas turbine engines, axisymmetric hardware, such as seals and/or hardware that delivers secondary airflow to an interior of the gas turbine engine, are supported adjacent to segmented flowpath components such as nozzles or transition ducts. During operation, thermal differentials between the axisymmetric hardware and the segmented flowpath components may result in destructive thermal stresses being induced between the axisymmetric hardware and the segmented flowpath components. Although providing for relative radial movement between the segmented flowpath components and the axisymmetric hardware may facilitate reducing such destructive thermal stresses, such arrangements make it more difficult to maintain at least some of the axisymmetric hardware substantially concentric to the engine centerline axis to facilitate proper operation of the air seals and a reduction in the rubs between the air seals and the segmented flowpath components.

For example, at least one known gas turbine engine includes a plurality of radial tabs that are formed integrally with a nozzle inner band to support the interior hardware such that a predetermined separation is facilitated to be maintained between the interior hardware and the segmented flowpath components. Moreover, a plurality of radial grooves engage the tabs and permit relative radial movement while maintaining the orientation of the interior hardware axially and circumferentially. However, when the nozzle tabs are engaged within the radial grooves during engine assembly, relative clearances defined between the nozzle tabs and the radial grooves may exceed predetermined tolerances resulting in a misalignment between the inner hardware and the segmented flowpath components.

Another known gas turbine engine includes a combustor casing that includes a plurality of radial pins having a first diameter, and a cowl boss that includes a plurality of holes having a second diameter that is at least fifty thousandths of an inch larger than the first diameter. The plurality of radial pins engage the plurality of radial holes to permit relative radial movement while positioning the cowl boss within the combustor casing. However, when the radial pins are engaged in the radial holes, the relative clearances defined between the radial pins and the radial holes may exceed predetermined tolerances resulting in a misalignment between the combustor casing and the cowl boss.

BRIEF DESCRIPTION OF THE INVENTION

In one aspect, a method for assembling a gas turbine engine is provided. The method includes coupling an outer structure within the gas turbine engine, wherein the outer structure includes a socket extending from a radially inner surface of the outer structure, and coupling an inner structure to the outer structure by inserting a radial pin through the inner structure and into the socket such that the inner structure is aligned axially, circumferentially, and with respect to an engine centerline axis extending through the gas turbine engine.

In another aspect, an alignment apparatus for positioning an inner structure with respect to an outer structure in a gas turbine engine is provided. The inner structure includes a socket and the outer structure includes a first opening and at least one second opening. The alignment apparatus includes a radial pin inserted through the inner structure first opening and into the socket such that the inner structure is aligned axially, circumferentially, and with respect to an engine centerline axis extending through the gas turbine engine; and at least one fastener inserted through the inner structure second opening and configured to secure the radial pin to the inner structure.

In a further aspect, a gas turbine engine is provided. The gas turbine engine includes an outer structure comprising at least one opening extending therethrough, an inner structure comprising a socket, and a radial pin extending through the inner structure and into the socket such that the inner structure is aligned axially, circumferentially, and with respect to an engine centerline axis extending through the gas turbine engine.

DETAILED DESCRIPTION OF THE INVENTION

Figure 1:
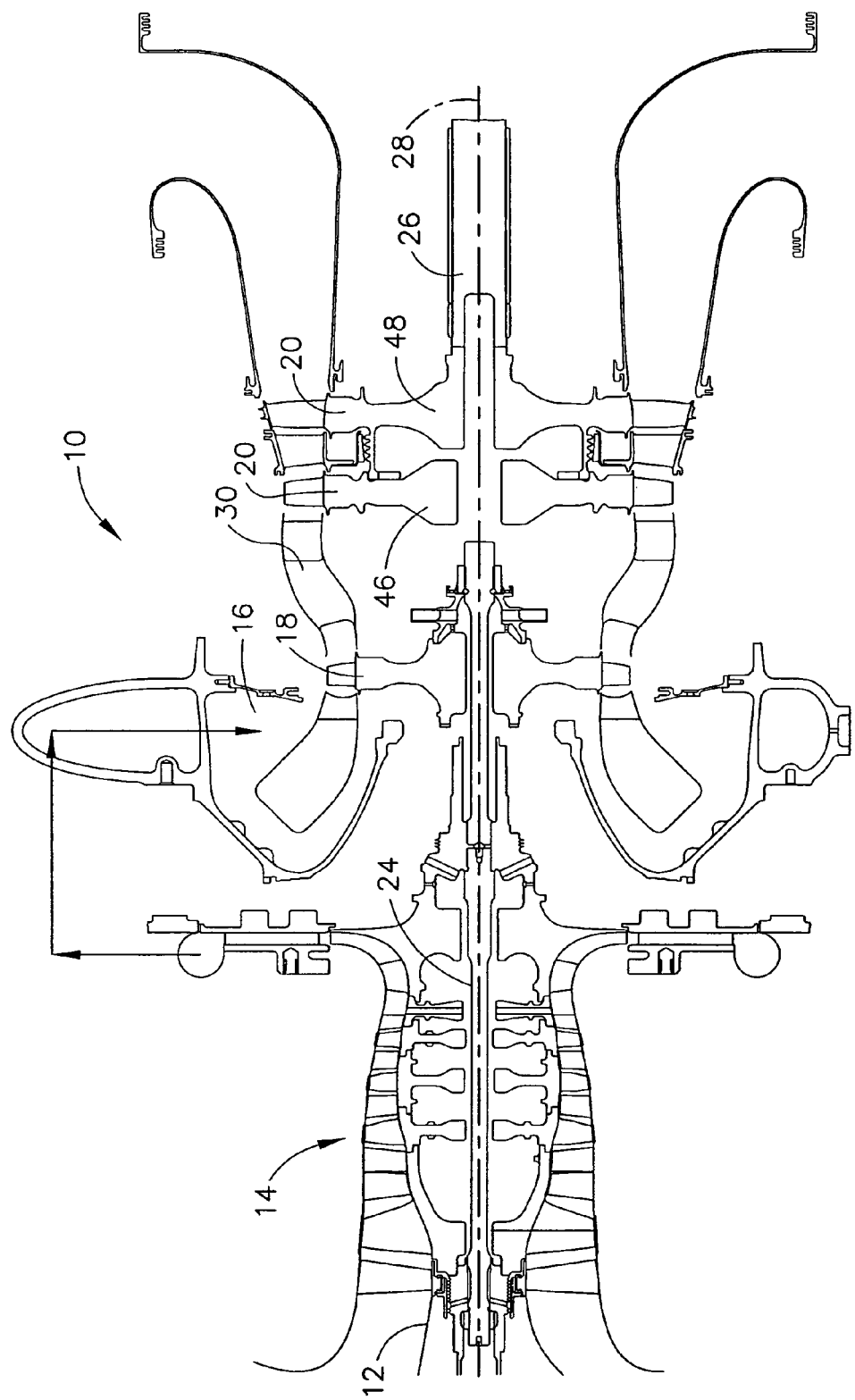
FIG. 1 is a schematic view of an exemplary gas turbine engine.

FIG. 1 is a schematic illustration of a gas turbine engine 10 including a compressor 12 having a plurality of compressor blades 14, and a combustor 16. Engine 10 also includes a high pressure turbine 18 and a low pressure turbine 20. Compressor 12 is coupled to high pressure turbine 18 by a first shaft 24, and low pressure turbine 20 is coupled to an output (not shown) by a second output shaft 26. Shaft 26 provides a rotary motive force to drive a driven machine, such as, but not limited to a gearbox, a transmission, a generator, a fan, or a pump. In one embodiment, the gas turbine engine is an LV100 engine available from General Electric Company, Cincinnati, Ohio. In the exemplary embodiment, turbine 18 is a high pressure turbine, and turbine 20 is a low pressure turbine including two stages, 46, 48.

In operation, air enters compressor 12 and passes through compressor blades 14 which are configured to redirect the airflow from an axial airflow to a circumferential airflow with respect to an engine centerline axis 28. The highly compressed air is delivered to a recouperator (not shown) where hot exhaust gases from turbine 20 transfer heat are mixed with the compressed air. The heated compressed air is delivered to combustor 16. Airflow from combustor 16 enters turbine 18 and then passes through a segmented flowpath 30 to turbine 20.

Figure 2:
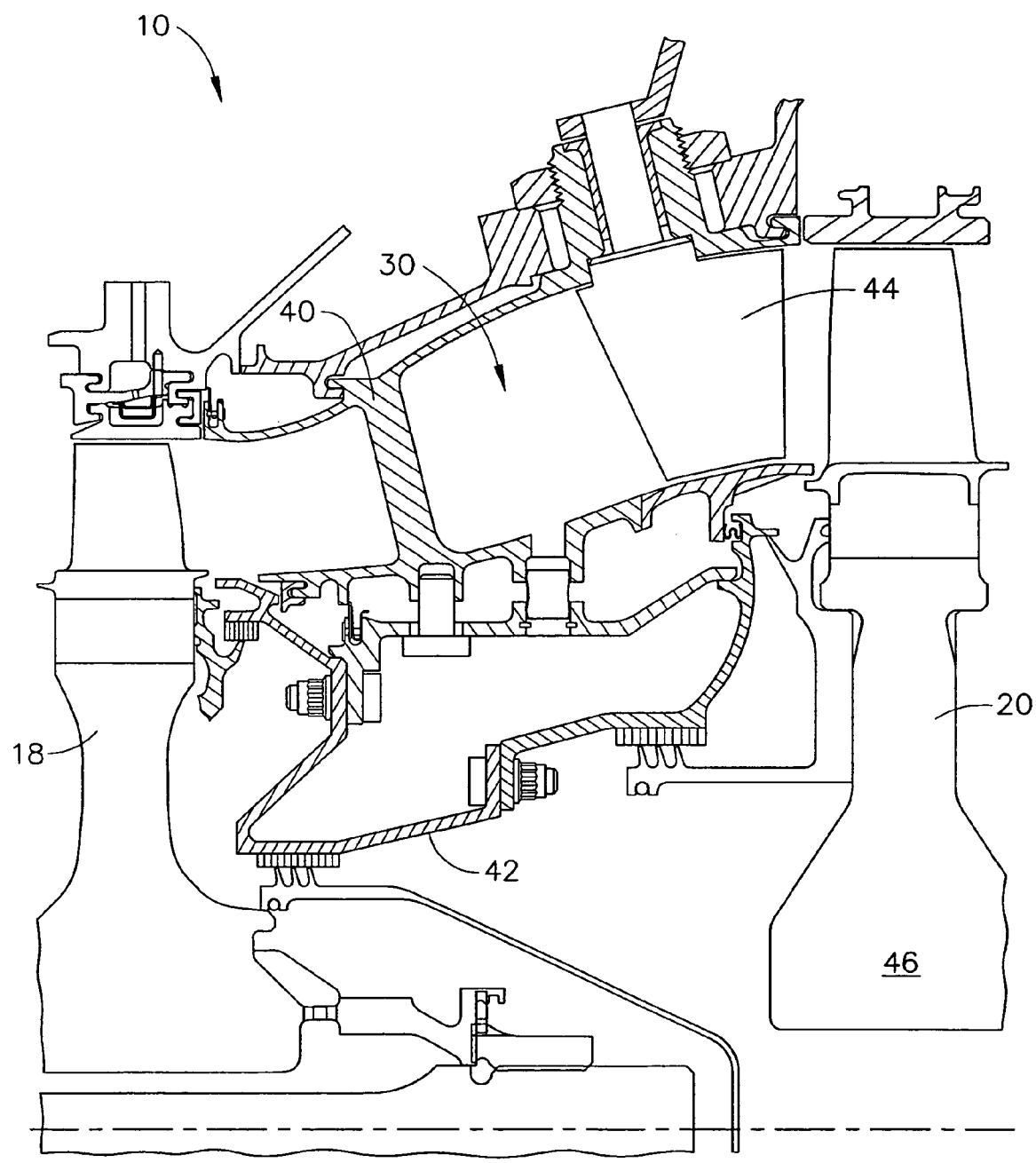
FIG. 2 is a cross-sectional view of a portion of the gas turbine engine shown in FIG. 1.
Figure 3:
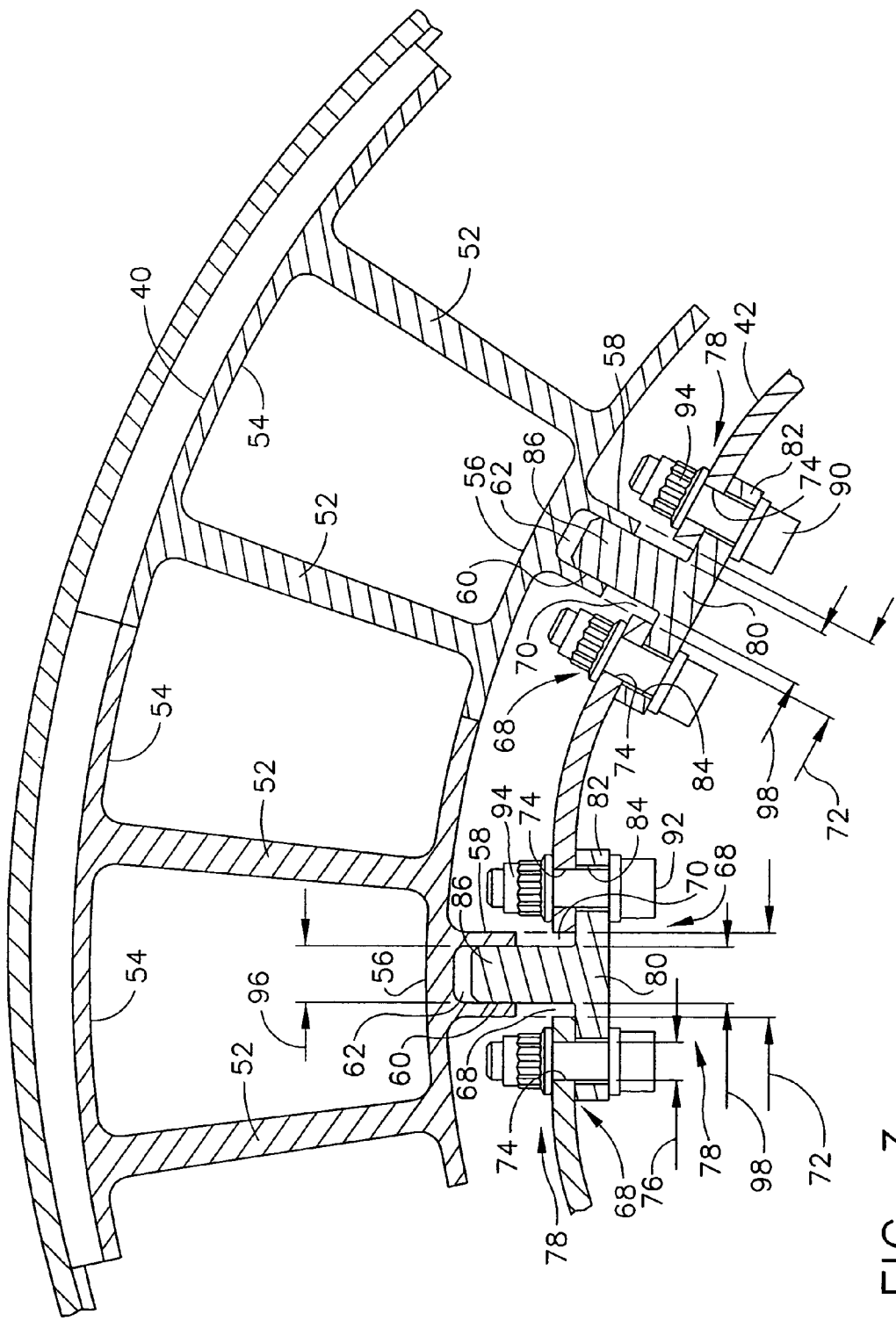
FIG. 3 is an enlarged end view of the portion of the gas turbine engine shown in FIG. 2.

FIG. 2 is a cross-sectional illustration of a portion of gas turbine engine 10 including a nozzle segment 40 and a inner hub structure 42 coupled to nozzle segment 40. FIG. 3 is an enlarged end view of gas turbine nozzle segment 40.

Although only two nozzle segments 40 are illustrated, it should be realized that gas turbine engine 10 includes a plurality of nozzle segments 40, coupled circumferentially together, such that nozzle segments 40 surround an inner periphery of gas turbine engine 10. In operation, airflow discharged from turbine 18 passes through segmented flowpath 30. More specifically, air discharged from turbine 18 passes through a plurality of nozzle segments 40 which channel airflow through a variable vane assembly 44 towards turbine 20.

Each nozzle segment 40 includes a plurality of circumferentially-spaced airfoil vanes 52 extending between a radially outer band or platform 54 and a radially inner band or platform 56. Although FIG. 3 illustrates nozzle segment 40 as including only two airfoil vanes 52, it should be noted that nozzle segment 40 may include any quantity of airfoil vanes and is not limited to only including two. Each nozzle segment 40 includes at least one socket or receptacle 58 having an inner surface 60 that defines a cavity 62 therein. In one embodiment, socket 58 is coupled to platform 56 by welding or brazing for example. In another embodiment, socket 58 is integrally formed with platform 56. In the exemplary embodiment, each socket 58 has a substantially circular cross-sectional profile. In an alternative embodiment, each socket 58 has a substantially non-circular cross-sectional profile.

Engine 10 also includes a inner hub structure 42 coupled to nozzle segment 40. Inner hub structure 42 includes a plurality of openings 68. In the exemplary embodiment, inner hub structure 42 includes a first opening 70 having a first opening width 72, and at least two second openings 74 that each have a second opening width 76. Engine 10 also includes an alignment apparatus 78 that facilitates aligning inner hub structure 42 and each nozzle segment 40 with respect to engine centerline axis 28. More specifically, alignment apparatus 78 includes a radial pin 80 that extends through first opening 70 into nozzle segment cavity 62. Radial pin 80 includes a first portion 82 including at least two openings 84, and a second portion 86 coupled to first portion 82. In the exemplary embodiment, first portion 82 and second portion 86 are integrally formed together such that radial pin 80 is a unitary radial pin 80. Engine 10 also includes a plurality of fasteners 90 that each include a fastener first portion 92 and a fastener second portion 94. In the exemplary embodiment, fastener first portion 92 is a bolt, and fastener second portion 94 is a locking nut, threadably coupled to the bolt.

In use, a method for installing, and circumferentially supporting axisymmetric hardware, such as seals and/or hardware use defined air cavities and deliver secondary airflow in the interior of segmented flowpath components such as nozzle segments 40 or transition ducts, includes supporting inner hub structure 42, relative to the interior of nozzle segments 40 using a plurality of radial pins 80. More specifically, a plurality of radial pins 80 are positioned 360° around inner hub structure 42, wherein each radial pin 80 is positionally adjustable to facilitate permitting a close male/female fit with nozzle segment 40 and therefore provide a precise positioning of the 360° inner hub structure 42 axially, circumferentially, and with respect to an engine centerline axis extending through the gas turbine engine. Accordingly, inner hub structure 42 is positioned from nozzle segments 40 using a plurality of radial pins 80 that are secured to inner hub structure 42 using fasteners 90. During installation, inner hub structure 42 is positioned relative to nozzle segments 40, and radial pin 80 is then inserted through first opening 70 and into nozzle segment cavity 62. Because cavity 62 has a cavity width 96 that is slightly larger than a radial pin width 98 of radial pin 80, inner hub structure 42 is facilitated to be positioned at a relatively constant axial position with respect to nozzle segments 40. More specifically, radial pin width 98 is less than approximately five one-thousandths of an inch smaller than cavity width 96.

Accordingly, the relatively tight tolerance between radial pin 80 and receptacle 58 facilitates maintaining each in a relatively constant axial position with respect to nozzle segments 40. Inner hub structure 42 is then positioned axially, circumferentially, and with respect to engine centerline axis 28. Once inner hub structure 42 is aligned with respect to nozzle segments 40, fasteners 90 are used to hold inner hub structure 42 in a substantially fixed radial position with respect to engine centerline axis 28. More specifically, because first opening 70 has a first opening width 72 that is larger than radial pin width 98 of second portion 86 of radial pin 80, inner hub structure 42 is circumferentially rotatable with respect to nozzle segments 40 to facilitate aligning inner hub structure 42. Once assembled, radial pins 80 facilitate maintaining a proper alignment of hub structure 42 through friction due to the clamp provided by the fasteners 90.

In the exemplary embodiment, a method and apparatus has been described that facilitates aligning an inner structure with respect to an outer structure in a gas turbine engine. More specifically, securing a hub structure to a plurality of segmented nozzles using a plurality of radial pins facilitates precise concentric positioning of axisymmetric hardware mounted internal to a segmented flowpath structure.

The above-described support arrangement for hardware positioned on the interior of a segmented flow path provides a cost-effective and reliable means for aligning gas turbine interior support hardware with respect to the segmented flowpath components. More specifically, a radial pin is inserted into a cavity of the segmented nozzle to align the interior support structure. The interior support structure is then positioned axially, circumferentially, and with respect to engine axis 28. The fasteners are then tightened to facilitate holding the interior support structure both axially and circumferentially within the gas turbine engine.

An exemplary embodiment of a gas turbine engine support arrangement is described above in detail. The support arrangement components illustrated are not limited to the specific embodiments described herein, but rather, components of each support arrangement may be utilized independently and separately from other components described herein. For example, although segmented nozzles are described herein, the radial pins may also be used to align a variety of interior structure hardware to hardware other than segmented nozzles.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

coupling a first structure within the gas turbine engine, wherein the first structure includes a plurality of closed-end sockets extending from a radially inner surface of the first structure; and coupling a second structure to the first structure by inserting a radial pin through the second structure and into each respective socket such that the first structure is aligned axially, circumferentially, and with respect to an engine centerline axis extending through the gas turbine engine;

wherein the second structure also includes at least one second opening and the radial pin includes at least one opening, wherein said coupling a second structure to the first structure by inserting a pin through the second structure further comprises:

inserting a fastener through the radial pin opening and through the second structure opening; and using the fastener to secure the radial pin to the first structure such that the second structure is aligned axially, circumferentially, and with respect to an engine centerline axis extending through the gas turbine engine.

2. A method in accordance with claim 1 wherein said coupling a first structure within the gas turbine engine further comprises coupling a plurality of segmented nozzles within the gas turbine engine, wherein each segmented nozzle includes a socket extending from a radially inner surface of the segmented nozzle.

3. A method in accordance with claim 1 wherein said coupling a first structure within the gas turbine engine further comprises coupling a plurality of segmented nozzles within the gas turbine engine, wherein each segmented nozzle includes a socket integrally formed with each segmented nozzle and extending from a radially inner surface of the segmented nozzle.

4. A method in accordance with claim 1 wherein said inserting a pin through the second structure and into the socket comprises inserting a radial pin through the second structure and into the socket, wherein the socket has a first width and the radial pin has a second width that is approximately five one-thousandths of an inch smaller than the first width.

5. An apparatus for coupling an inner structure to an outer structure in a gas turbine engine, wherein at least one of the outer structure and the inner structure includes a plurality of closed-end sockets, and wherein the remaining structure includes at least a first opening and a second opening, said apparatus comprises:

a radial pin inserted through said structure first opening and into each said socket such that said inner structure is aligned axially, circumferentially, and with respect to an engine centerline axis extending through the gas turbine engine; and at least one fastener inserted through said structure second opening such that each said radial pin is secured to said inner structure.

6. An apparatus in accordance with claim 5 wherein at least one of the outer structure and the inner structure further includes a plurality of nozzle segments.

7. An apparatus in accordance with claim 5 wherein said radial pin comprises two openings and said apparatus further comprises exactly two fasteners inserted through said two radial pin openings and said inner structure second openings.

8. An apparatus in accordance with claim 5 wherein said socket comprises a first width and said radial pin comprises a second width that is approximately five one-thousandths of an inch less than said first width.

9. A gas turbine engine comprising:

an outer structure comprising a plurality of closed-end sockets;

an inner structure comprising a plurality of openings extending therethrough; and a radial pin extending through said inner structure and into each said socket such that said inner structure is aligned axially, circumferentially, and with respect to an engine centerline axis extending through the gas turbine engine;

and further comprising a plurality of fasteners extending through said radial pin and said inner hub structure, said plurality of fasteners configured to couple said radial pin to said inner structure.

10. A gas turbine engine in accordance with claim 9 wherein said outer structure comprises a plurality of nozzle segments.

11. A gas turbine engine in accordance with claim 10 wherein each said socket is formed unitarily with each said nozzle segment.

12. A gas turbine engine in accordance with claim 9 wherein each said socket comprises a first width and each said radial pin comprises a second width that is approximately five one-thousandths of an inch less than said first width.

13. A gas turbine engine in accordance with claim 9 wherein each said fastener comprises a bolt and a locking nut coupled to said bolt.

14. A gas turbine engine in accordance with claim 9 wherein said radial pin comprises a substantially circular cross-sectional profile and said socket comprises a cross-sectional profile substantially similar to said radial pin cross-sectional profile.

15. A gas turbine engine in accordance with claim 10 wherein each said nozzle segment comprises exactly one socket configured to receive said radial pin.

16. A gas turbine engine in accordance with claim 9 wherein each said radial pin is secured to the inner hub structure using exactly two fasteners.

17. A gas turbine engine in accordance with claim 9 wherein said gas turbine engine comprises a two-stage low-pressure turbine and a single-stage high pressure turbine.

* * * * *